United States Patent
Leparoux et al.

(10) Patent No.: US 12,025,313 B2
(45) Date of Patent: Jul. 2, 2024

(54) COMBUSTION CHAMBER COMPRISING SECONDARY INJECTION SYSTEMS, AND FUEL SUPPLY METHOD

(71) Applicant: SAFRAN AIRCRAFT ENGINES, Paris (FR)

(72) Inventors: Julien Marc Matthieu Leparoux, Moissy-Cramayel (FR); Jean-François Cabre, Moissy-Cramayel (FR); Haris Musaefendic, Moissy-Cramayel (FR); Romain Nicolas Lunel, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/630,284

(22) PCT Filed: Jul. 27, 2020

(86) PCT No.: PCT/FR2020/051369
§ 371 (c)(1),
(2) Date: Jan. 26, 2022

(87) PCT Pub. No.: WO2021/019172
PCT Pub. Date: Feb. 4, 2021

(65) Prior Publication Data
US 2022/0275941 A1 Sep. 1, 2022

(30) Foreign Application Priority Data

Jul. 29, 2019 (FR) ........................................ 1908618

(51) Int. Cl.
| F23R 3/34 | (2006.01) |
| F02C 7/22 | (2006.01) |
| F23R 3/50 | (2006.01) |

(52) U.S. Cl.
CPC ................ F23R 3/343 (2013.01); F02C 7/22 (2013.01); F23R 3/50 (2013.01); *F23R 2900/03343* (2013.01)

(58) Field of Classification Search
CPC .... F23R 3/10; F23R 3/343; F23R 3/46; F23R 3/50; F23R 2900/03343
See application file for complete search history.

(56) References Cited

U.S. PATENT DOCUMENTS

| 4,991,398 A * | 2/1991 | Clark | ........................ F23R 3/50 60/748 |
| 5,142,858 A * | 9/1992 | Ciokajlo | ................... F23R 3/10 60/749 |

(Continued)

FOREIGN PATENT DOCUMENTS

| CN | 104566460 A | 4/2015 |
| FR | 2951245 A1 | 4/2011 |
| JP | 2015218946 A | 12/2015 |

OTHER PUBLICATIONS

Search Report issued in French Patent Application No. 1908618 dated Feb. 14, 2020.

(Continued)

*Primary Examiner* — Arun Goyal
(74) *Attorney, Agent, or Firm* — Pearne & Gordon LLP

(57) ABSTRACT

A combustion chamber for an aircraft turbomachine includes an annular chamber end wall structure, an annular row of main injection systems mounted in the chamber end wall structure and configured to deliver a sheet of fuel, including a central recirculation region and a corner recirculation region around the central recirculation region, and secondary injection systems each configured to inject an additional flow of air and fuel directly into a corresponding corner recirculation region.

14 Claims, 7 Drawing Sheets

(56) References Cited

U.S. PATENT DOCUMENTS

| | | | | |
|---|---|---|---|---|
| 5,794,449 | A | * | 8/1998 | Razdan ................... F23R 3/286 60/737 |
| 5,885,068 | A | | 3/1999 | Döbbeling et al. |
| 6,360,525 | B1 | * | 3/2002 | Senior ....................... F23R 3/12 60/776 |
| 2010/0229562 | A1 | * | 9/2010 | Zupanc ................... F23R 3/343 60/751 |
| 2014/0272736 | A1 | | 9/2014 | Robertson et al. |
| 2017/0023251 | A1 | * | 1/2017 | Leparoux .................. F23R 3/12 |
| 2018/0283692 | A1 | * | 10/2018 | Ryon ........................ F23R 3/10 |
| 2020/0191093 | A1 | * | 6/2020 | Boardman ................ F02C 9/26 |

OTHER PUBLICATIONS

International Search Report for issued in Application No. PCT/FR2020/051369 dated Nov. 6, 2020.
Written Opinion for PCT/FR2020/051369 dated Nov. 6, 2020.
Office Action for corresponding Chinese application No. 2020800585998 dated Apr. 7, 2023.

* cited by examiner

COMBUSTION CHAMBER COMPRISING SECONDARY INJECTION SYSTEMS, AND FUEL SUPPLY METHOD

This is the National Stage of PCT international application PCT/FR2020/051369, filed on Jul. 27, 2020 entitled "COMBUSTION CHAMBER COMPRISING SECONDARY INJECTION SYSTEMS, AND FUEL SUPPLY METHOD", which claims the priority of French Patent Application No. 1908618 filed Jul. 29, 2019, both of which are incorporated herein by reference in their entirety.

TECHNICAL FIELD

The present invention relates to the field of aircraft turbine engines and relates more particularly to a combustion chamber equipped with injection systems generating a rotational flow of a mixture of air and fuel forming a central recirculation region and a corner recirculation region.

The invention also relates to a turbine engine comprising such a combustion chamber, as well as a method for supplying fuel to such a combustion chamber.

PRIOR ART

The accompanying FIG. 1 illustrates a turbine engine 10 for an aircraft, for example a bypass turbojet engine, including in general terms a fan 12 intended for aspirating an air flow dividing downstream of the fan into a primary flow PF supplying a core of the turbine engine and a secondary flow SF bypassing this core. The core of the turbine engine includes, in general terms, a low-pressure compressor 14, a high-pressure compressor 16, a combustion chamber 18, a high-pressure turbine 20 and a low-pressure turbine 22. The turbine engine is streamlined by a nacelle 24 surrounding the flow space of the secondary flow SF. The rotors of the turbine engine are mounted so as to rotate about a longitudinal axis 28 of the turbine engine.

In this whole description, except when it is stipulated otherwise, the axial direction X is the direction of the longitudinal axis 28, the radial direction R is at every point a direction orthogonal to the longitudinal axis 28 and passing through the latter, and the circumferential or tangential direction C is at every point a direction orthogonal to the radial direction R and to the longitudinal axis 28. The terms "radially inner" and "radially outer" refer respectively to a relative proximity, and a relative distancing, of an element with respect to the longitudinal axis 28. Finally, the "upstream" and "downstream" directions are defined with reference to the general direction of the flow of the gases in the primary PF and secondary SF streams of the turbine engine, in the axial direction X.

FIG. 2 shows the combustion chamber 18, in a known configuration. Conventionally, this combustion chamber, which is of the annular type, comprises two coaxial annular walls, respectively radially inner 32 and radially outer 34, which extend from upstream to downstream, in the direction 36 of the primary flow of gas in the turbine engine, around the axis of the combustion chamber that is coincident with the longitudinal axis 28 of the turbine engine. These radially inner 32 and radially outer 34 annular walls are connected together at their upstream end by an annular chamber-end structure 40, so that the annular chamber-end structure 40 and the two coaxial annular walls 32, 34 delimit externally an interior volume V of the combustion chamber. The annular chamber-end structure 40 is typically formed by an annular chamber-end wall 40A and an annular shield 40B, also referred to as a deflector, extending opposite the annular chamber-end wall 40A on the same side as the interior of the combustion chamber, in a well-known manner.

The annular chamber-end structure 40, which may be sectorised or not, includes passages 41, distributed in an annular row around the longitudinal axis 28, and through which injection systems 42, each configured for delivering a sheet of a mixture of air and fuel centred on a respective injection axis 44, are respectively mounted.

In addition, the combustion chamber is in general equipped with one or more spark plugs 45 mounted through the external annular wall 34.

In operation, a part 46 of an air flow 48 coming from the high-pressure compressor 16 supplies the injection systems 42 while another part 50 of this air bypasses the combustion chamber while flowing towards the downstream end along the coaxial walls 32 and 34 of this chamber and in particular supplies air-inlet orifices provided in these walls 32 and 34, to allow a staged operation of the RQL (Rich-Quench-Lean) type.

As shown by FIG. 3, each injection system 42 includes in general terms a socket 52, sometimes referred to as a "sliding traverse", in which a fuel injection nozzle 54 is mounted, as well as one or more air-inlet swirlers 56, 58, optionally separated from each other by a wall 59 with a radially inner end with a convergent-divergent form, normally referred to as «venturi», and finally a bowl 60, sometimes referred to as a "mixer bowl", which essentially takes the form of a wall of revolution having a form that diverges towards the downstream end. These elements are centred with respect to the injection axis 44.

In operation, the air entering through the air-inlet swirlers 56, 58 mixes with the fuel coming from the fuel injection nozzle 54 while forming a rotational flow 61, sometimes referred to as "swirled flow", which gives rise to two types of recirculation region in the interior volume V: a central recirculation region 62 and a corner recirculation region 64, the latter extending around the central recirculation region. The reference 66 designates the limit of the central recirculation region 62, which closes up towards the downstream end.

Current injection technology is based on the use of a fuel injection nozzle 54 of the aerodynamic or aeromechanical type, configured for atomising the fuel towards the central recirculation regions 62 in order to stabilise the combustion flame.

In normal operation, the stability of the current combustion chamber is characterised by its ability to remain ignited when the supply of air or fuel varies. Extinction of the combustion chamber may take place at any moment, if the operation thereof departs from the limits of stability. Such conditions are encountered mainly when the turbine engine is operating at low speed, in particular at idle and at speeds lower than idle. However, the inventors have determined that stabilisation of the flame at low speed is based primarily on good carburation in the corner recirculation regions.

In addition, in the case of restarting in flight, the thermal conditions of the engine at rest mean that it is difficult to create a core of energy and to propagate it in order to obtain self-maintained combustion, all the more so since the pressure in the combustion chamber is lower than atmospheric pressure. The low pressure reduces the energy contained in the air flow necessary for atomising the fuel in liquid form and to produce a spray containing sufficiently small drops to ignite the chamber. The low temperature furthermore reduces the evaporation of the drops forming the spray, which is however desirable.

According to the dimensions of the chamber and the position of the spark plug, it happens that, under certain operating conditions, the energy core in the vicinity of the spark plug is not captured by the central recirculation region and that the ignition process fails. Another possible cause of failure may be an insufficient concentration of fuel in the vicinity of the spark plug to obtain an energy core.

Moreover, for combustion chambers based on RQL ("Rich-Quench-Lean") technology, the whole of the fuel introduced into the combustion chamber comes from the injection systems mounted in the annular chamber-end structure. Consequently the combustion and the temperature field are not uniform in the combustion chamber. This heterogeneity favours the emission of polluting compounds.

The document US 20170023251 of the applicant proposes solving or at least attenuating these problems by means of secondary fuel-injection nozzles configured for injecting fuel directly into the corner regions when the turbine engine is operating at low speed.

DESCRIPTION OF THE INVENTION

The aim of the present invention is in particular to optimise the implementation of the general principle presented in the aforementioned document US 20170023251.

It proposes for this purpose a combustion chamber for an aircraft turbine engine, comprising:
an annular chamber-end structure, and two coaxial annular walls connected together by the annular chamber-end structure and centred with respect to a longitudinal axis of the combustion chamber, so that the annular chamber-end structure and the two coaxial annular walls delimit an interior volume of the combustion chamber;
main passages formed through the annular chamber-end structure; and
an annular row of main injection systems mounted respectively in the main passages, each main injection system comprising a respective main fuel-injection nozzle defining a respective injection axis, and at least one respective air-inlet swirler, for delivering, in the interior volume of the combustion chamber, a respective sheet of an air/fuel mixture, centred on the respective injection axis and comprising a respective central recirculation region, and a respective corner recirculating region extending annularly around the respective central recirculation region;
secondary injection systems each configured for injecting an additional flow of air and fuel directly into the respective corner recirculation region of the sheet of air-fuel mixture delivered by a corresponding main injection system, each secondary injection system comprising at least one secondary injection device configured for supplying at least part of the fuel of the corresponding additional flow of air and fuel and at least part of the air of the corresponding additional flow of air and fuel, through a corresponding secondary injection region of the annular chamber-end structure separated from the main passage through which the corresponding main injection system is mounted.

In general terms, the injection of fuel and air into the corner recirculation regions by means of the secondary injection systems makes it possible to improve the carburation in these regions, and therefore to lower the limit of extinction of the combustion chamber, i.e. the minimum operating speed below which the combustion chamber is extinguished, and to facilitate re-ignition of the combustion chamber in flight.

The invention also makes it possible to improve the homogeneity of the combustion region in the interior volume of the combustion chamber, and therefore to reduce the emissions of polluting compounds, in particular carbon monoxide.

According to the invention, each secondary injection device includes a respective secondary fuel-injection nozzle, mounted in a corresponding secondary passage formed through the corresponding secondary injection region, in the annular chamber-end structure, to supply said at least part of the fuel of the corresponding additional flow of air and fuel, and a respective annular set of air-inlet orifices formed in the corresponding secondary injection region in the annular chamber-end structure, distributed around said corresponding secondary passage, and emerging in the interior volume of the combustion chamber, so as to supply said at least part of the air of the corresponding additional flow of air and fuel.

Preferably, each secondary injection device further includes a respective divergent annular surface, formed in the annular chamber-end structure so as to delimit an outlet of the corresponding secondary passage, and having a form divergent in the direction of the interior volume of the combustion chamber.

Preferably, the respective annular set of air-inlet orifices of each secondary injection device includes first air-inlet orifices formed in the respective divergent annular surface of the secondary injection device.

Preferably, the respective annular set of air-inlet orifices of each secondary injection device includes second air-inlet orifices arranged around the respective divergent annular surface of the secondary injection device.

Preferably, the annular set of air-inlet orifices of each secondary injection device is configured for conferring a swirling character on the air passing through said annular set of air-inlet orifices.

Preferably, the annular chamber-end structure includes an annular chamber-end wall arranged on an external side of the combustion chamber and connecting the two coaxial annular walls to each other, and an annular shield arranged on an interior side of the combustion chamber opposite the annular chamber-end wall.

Preferably, each secondary passage is formed by a respective secondary orifice formed in the annular shield, and a respective annular opening formed in the annular chamber-end wall, opposite the respective secondary orifice.

Preferably, the respective annular set of air-inlet orifices of each secondary injection device is formed in the annular shield, around the respective secondary orifice of the secondary injection device.

The invention also relates to a turbine engine, comprising a combustion chamber of the type described above, and a secondary fuel supply system configured for supplying the secondary injection systems with fuel when the turbine engine is operating at an operating speed below or equal to a predetermined speed, and for stopping the fuel supply to the secondary injection systems when the turbine engine is operating at an operating speed higher than the predetermined speed.

Preferably, the predetermined speed is the idle speed.

Preferably, the turbine engine further comprises a main fuel supply system comprising main tubes at the end of which the respective main fuel injection nozzles of the main injection systems are respectively arranged, and wherein the secondary fuel supply system comprises secondary tubes at the end of which the secondary injection devices are respectively connected, the secondary tubes each being connected to a corresponding main tube.

Preferably, each secondary tube includes a proximal portion extending transversely to the injection axis defined by the corresponding main fuel-injection nozzle.

The invention also relates to a method for supplying fuel to a combustion chamber of the type described above in a turbine engine, which comprises the supply of fuel to the secondary injection systems when the turbine engine is operating at a speed below or equal to a predetermined speed, so that the secondary injection systems inject the additional flow of air and fuel directly into the respective corner recirculation regions of the sheets of the air/fuel mixture respectively delivered by the main injection systems of the combustion chamber.

Preferably, the method further comprises the stoppage of the supply of fuel to the secondary injection systems when the turbine engine is operating at a speed higher than the predetermined speed.

BRIEF DESCRIPTION OF THE DRAWINGS

The invention will be better understood, and other details, advantages and features thereof will emerge from the reading of the following description made by way of non-limitative example with reference to the accompanying drawings, wherein.

In all these figures, identical references can designate identical or similar elements.

DETAILED DESCRIPTION OF PREFERRED EMBODIMENTS

Figure 1:
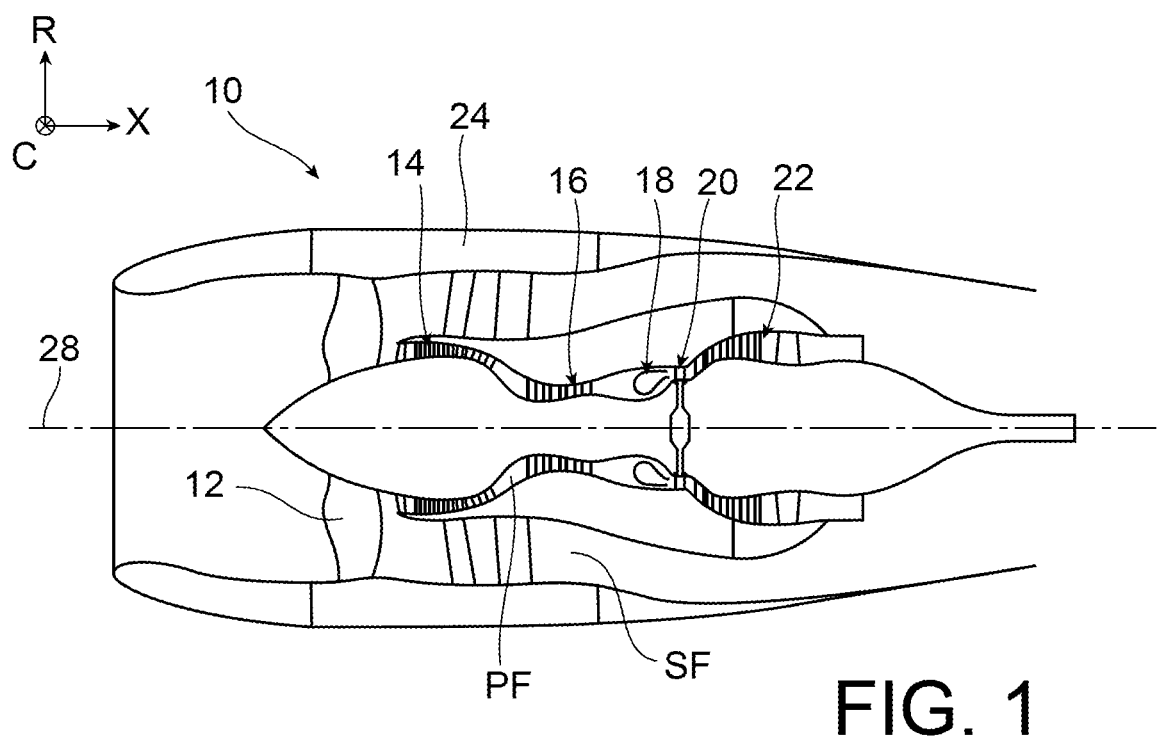
FIG. 1, already described, is a partial schematic view in axial section of a turbine engine.
Figure 2:
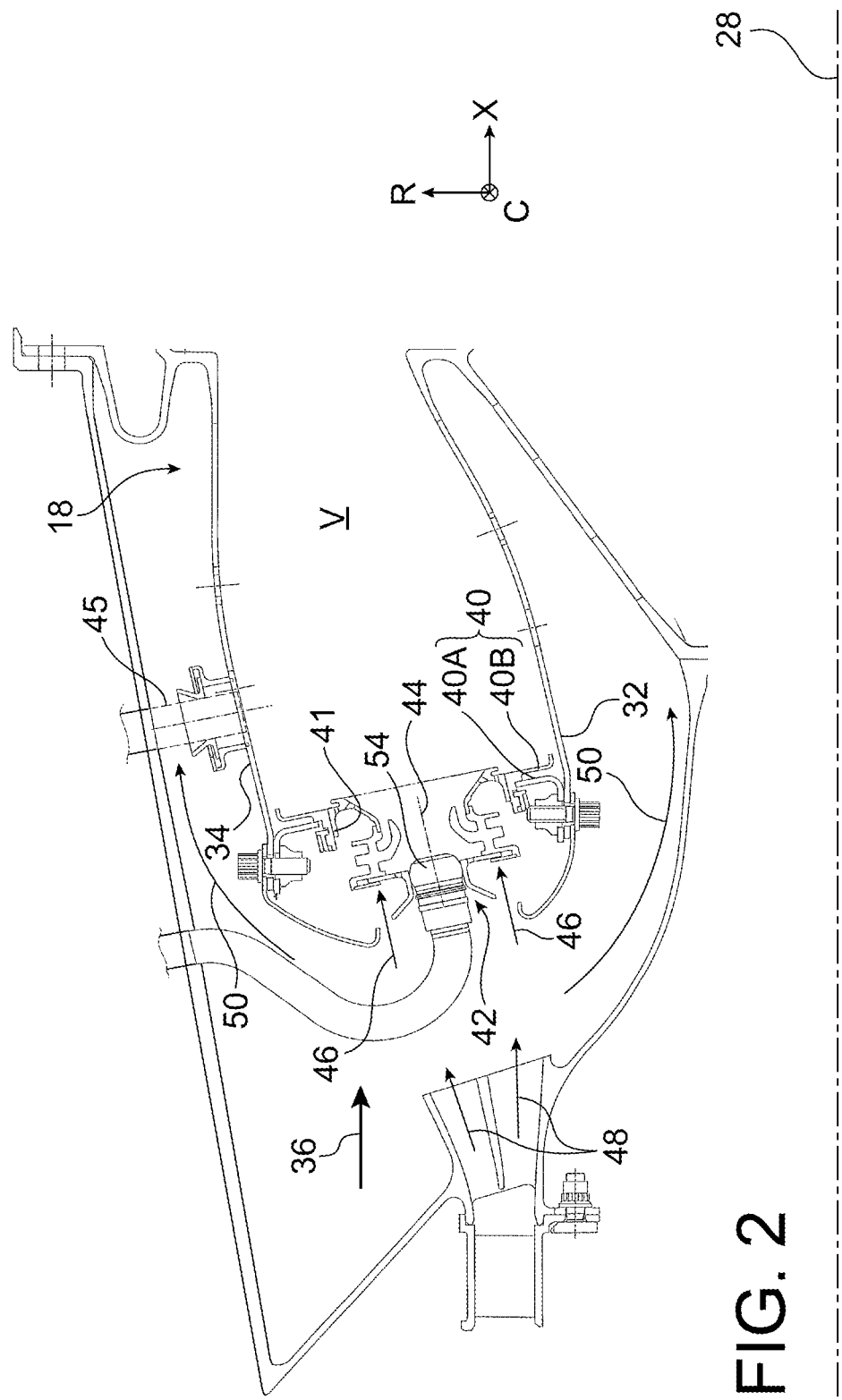
FIG. 2, already described, is a partial schematic view in axial section of a combustion chamber according to a known configuration, in the turbine engine of FIG. 1.
Figure 3:
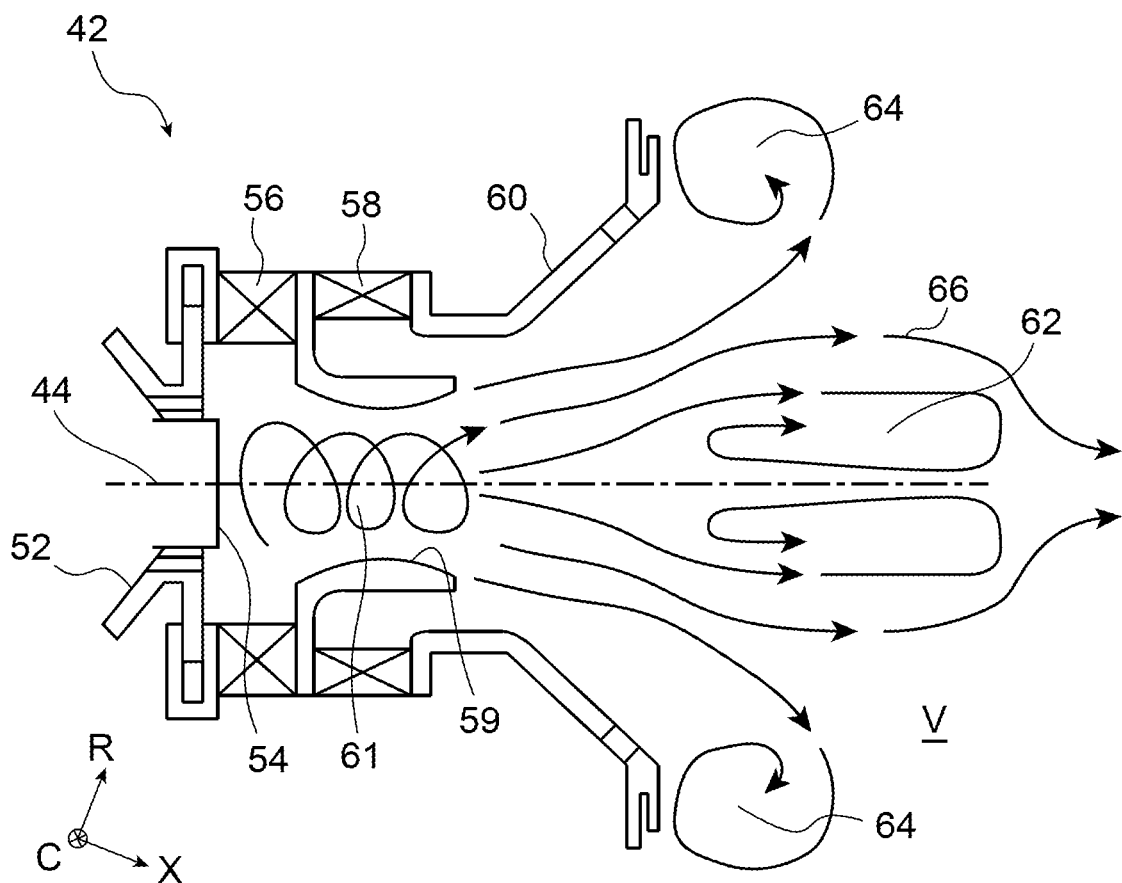
FIG. 3, already described, is a partial schematic view in axial section of an injection system equipping the combustion chamber of FIG. 2.

FIGS. 4 to 8 partially illustrate a combustion chamber 68 of a turbine engine according to a preferred embodiment of the invention. This combustion chamber 68 is roughly similar to the combustion chamber 18 of FIGS. 2 and 3, so that the features common to these two combustion chambers will not be repeated hereinafter.

FIGS. 4 to 8 show more particularly an angular sector of the annular chamber-end structure 40 of the combustion chamber 68.

Figure 4:
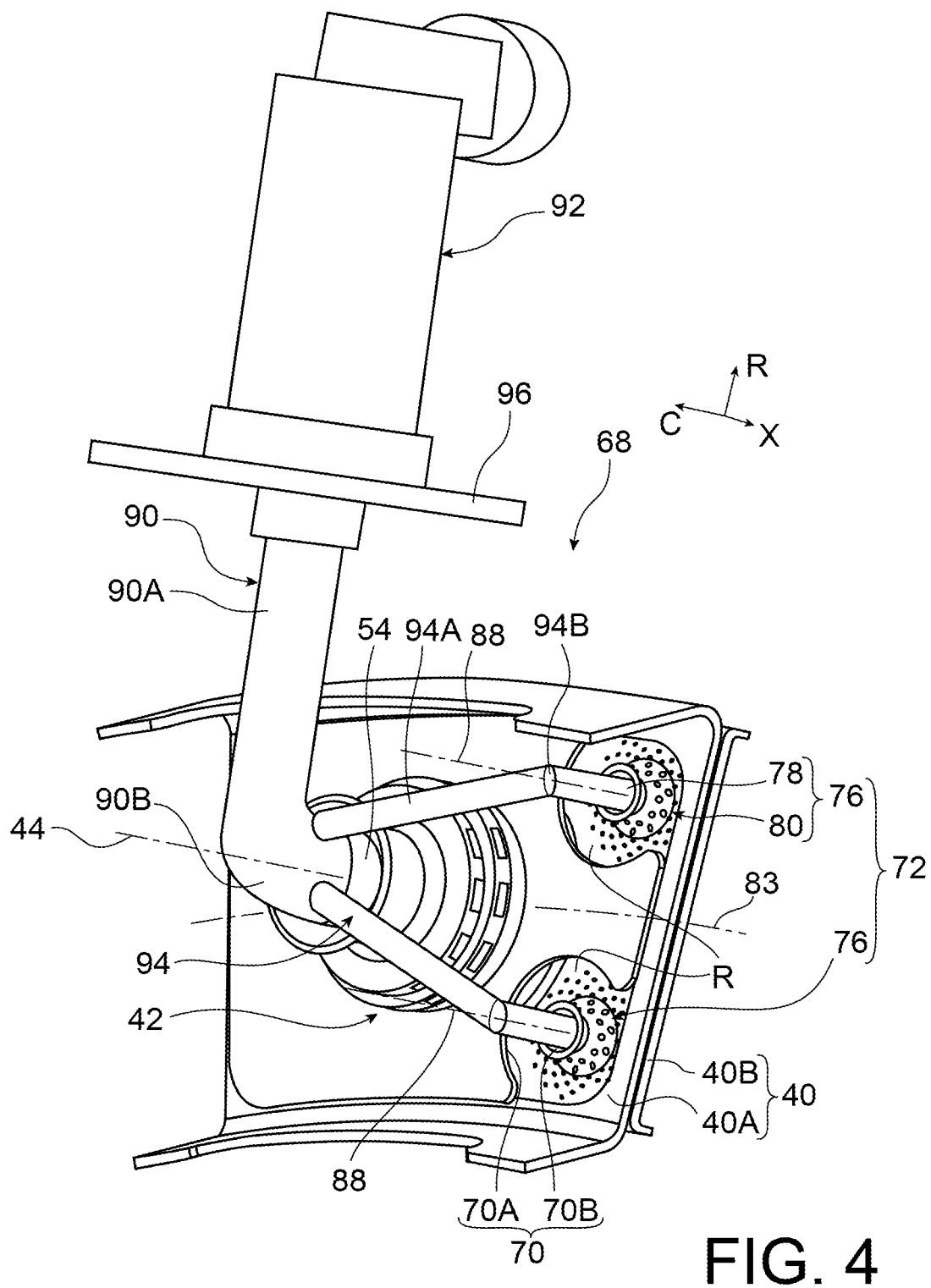
FIG. 4 is a partial schematic view in perspective, from upstream, of an annular chamber-end structure and of main and secondary fuel-supply systems of a combustion chamber according to a preferred embodiment of the invention, in a turbine engine such as the one in FIG. 1.
Figure 5:
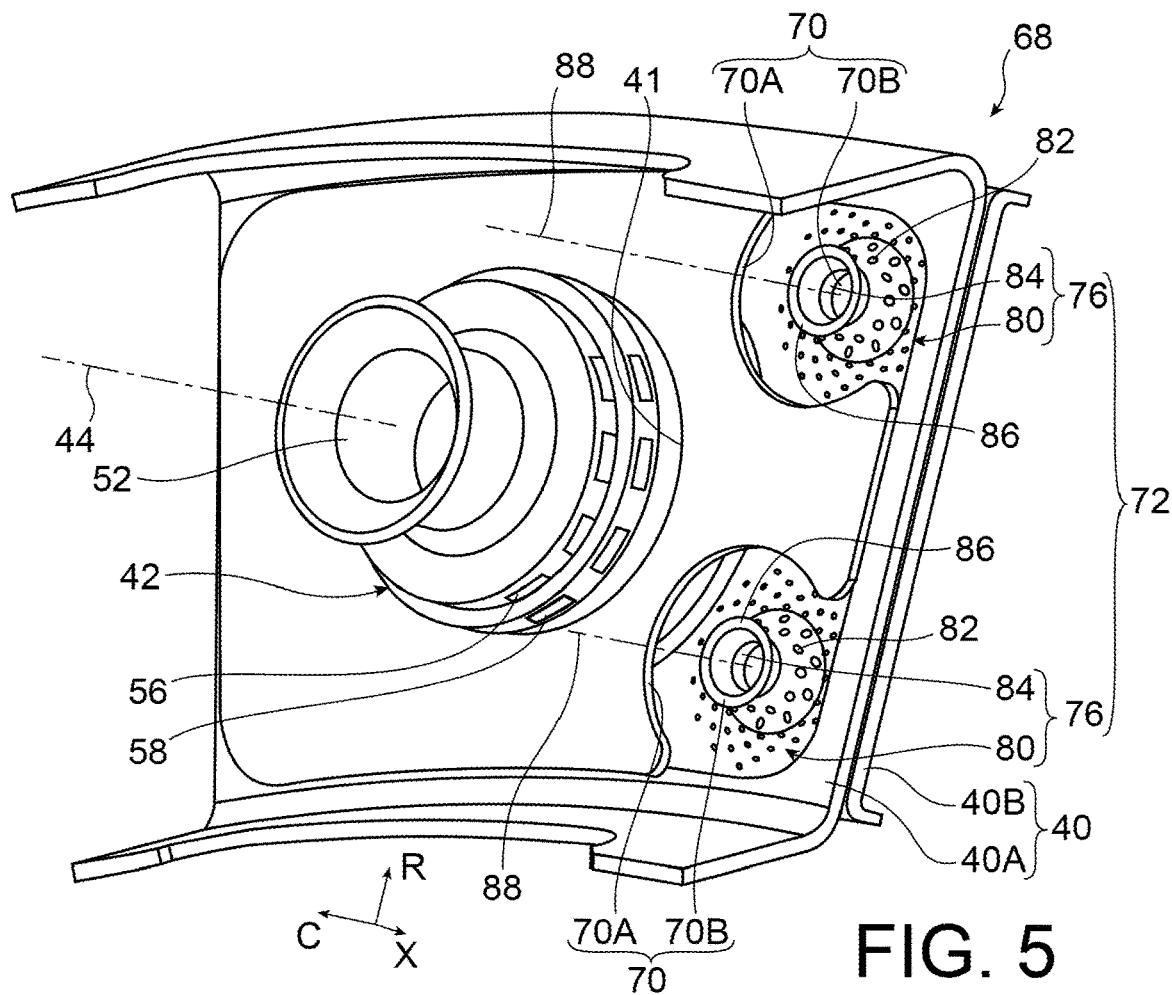
FIG. 5 is a view similar to FIG. 4, without the main and secondary fuel-supply systems.
Figure 6:
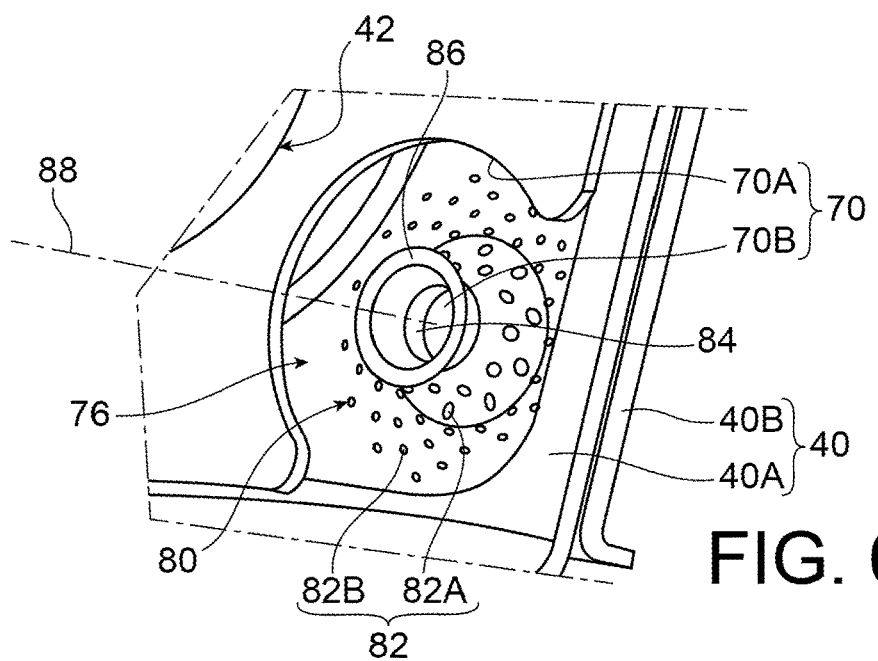
FIG. 6 is a view to a larger scale of a part of FIG. 5.

FIGS. 4 and 5 thus make it possible to perceive one of the injection systems 42, which are referred to as "main injection systems" hereinafter. In a similar manner, the passages 41 (FIG. 5) formed through the annular chamber-end structure 40 and wherein the main injection systems 42 are mounted are referred to as "main passages". The main injections systems 42 may be of the aeromechanical or aerodynamic type.

In addition, the combustion chamber 68 comprises secondary injection systems 72 (FIGS. 4-8) each configured for injecting an additional flow of air and fuel directly into a respective corner recirculation region 64 of the sheet of the air-fuel mixture delivered by a corresponding main injection system 42. In other words, each corner recirculation region 64 directly receives a corresponding additional flow of air and fuel, coming from a corresponding secondary injection system 72.

For this purpose, each secondary injection system 72 comprises one or more secondary injection devices 76, for example two in number.

Each secondary injection device 76 is configured for supplying at least part of the fuel of the corresponding additional flow of air and fuel and at least part of the air of the corresponding additional flow of air and fuel, through a corresponding secondary injection region R of the annular chamber-end structure 40. Said corresponding secondary injection region R is separated from any main passage 41, and is in particular separated from the main passage 41 through which the corresponding main injection system 42 is mounted.

For this purpose, each secondary injection device 76 includes a respective secondary fuel-injection nozzle 78 mounted in a corresponding secondary passage 70 formed through the corresponding secondary injection region R, in the annular chamber-end structure 40, so as to inject said part of the fuel of the corresponding additional flow of air and fuel, directly into the corresponding corner recirculation region 64.

In addition, each secondary injection device 76 includes a respective annular set 80 of air-inlet orifices 82 formed in the annular chamber-end structure 40. These air-inlet orifices 82 are arranged in the corresponding secondary injection region R while being distributed around the corresponding secondary passage 70, and these air-inlet orifices 82 emerge in the interior volume V of the combustion chamber 68.

The expression "injecting fuel directly into the corner recirculation region" aims at specifying that the fuel coming from each secondary fuel-injection nozzle 78 reaches the corresponding corner recirculation region 64 without passing through other parts of the air/fuel mixture sheet coming from the corresponding main injection system 42, in particular without passing through the central recirculation region 62 of this sheet, and without passing through the interior of the corresponding main injection system 42. For this purpose, each secondary injection device 76 emerges axially opposite the corresponding corner recirculation region 64, in the direction of the corresponding injection axis 44.

In the embodiment illustrated, the annular chamber-end structure 40 being formed by an annular chamber-end wall 40A and by an annular shield 40B as explained above, each secondary passage 70 is formed by a respective secondary orifice 70B formed in the annular shield 40B, and by a respective secondary opening 70A formed in the annular chamber-end wall 40A, opposite the respective secondary orifice 70B.

In addition, the respective annular set 80 of air-inlet orifices 82 of each secondary injection device 76 is formed in the annular shield 40B, around the respective secondary orifice 70B of the secondary injection device 76.

In order to facilitate the supply of air to the corresponding air-inlet orifices 82, each secondary opening 70A has a larger diameter than that of the corresponding secondary orifice 70B.

The air-inlet orifices 82 preferably have a diameter of between 0.3 mm and 0.6 mm (inclusive).

Figure 7:
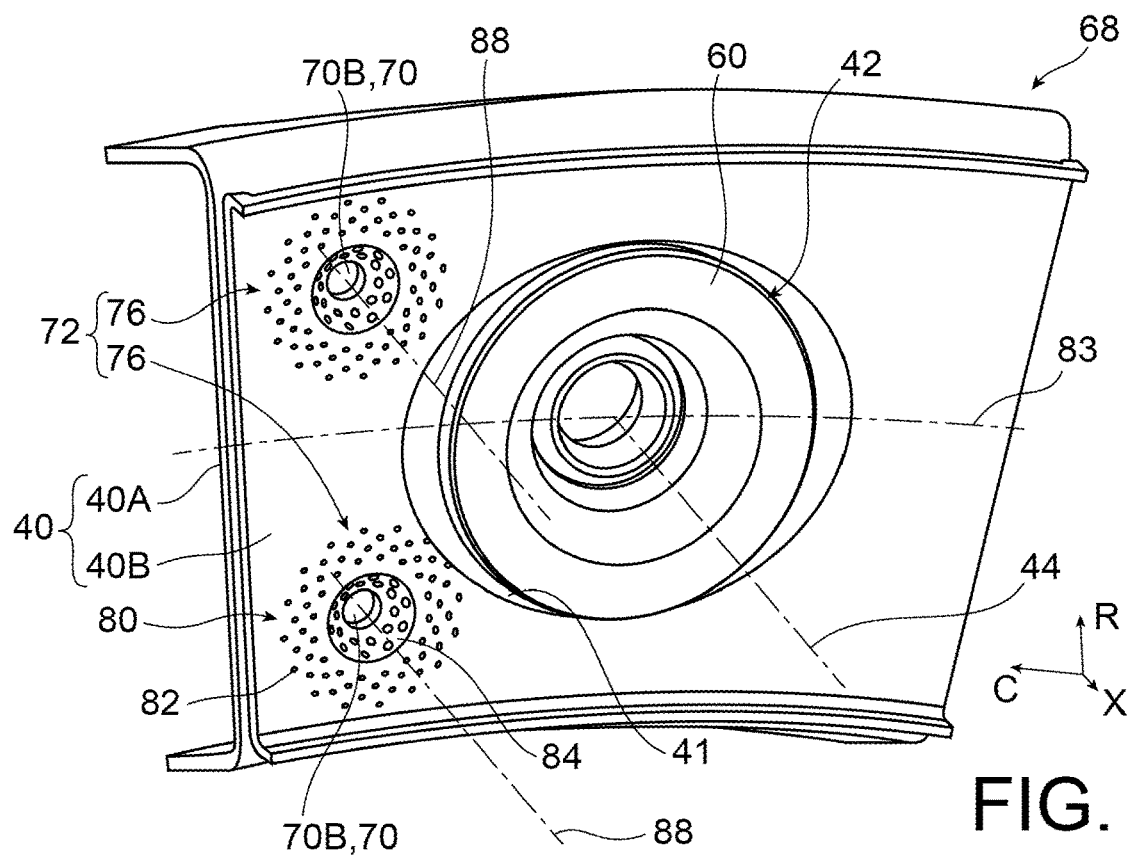
FIG. 7 is a view similar to FIG. 5, from the downstream end.
Figure 8:
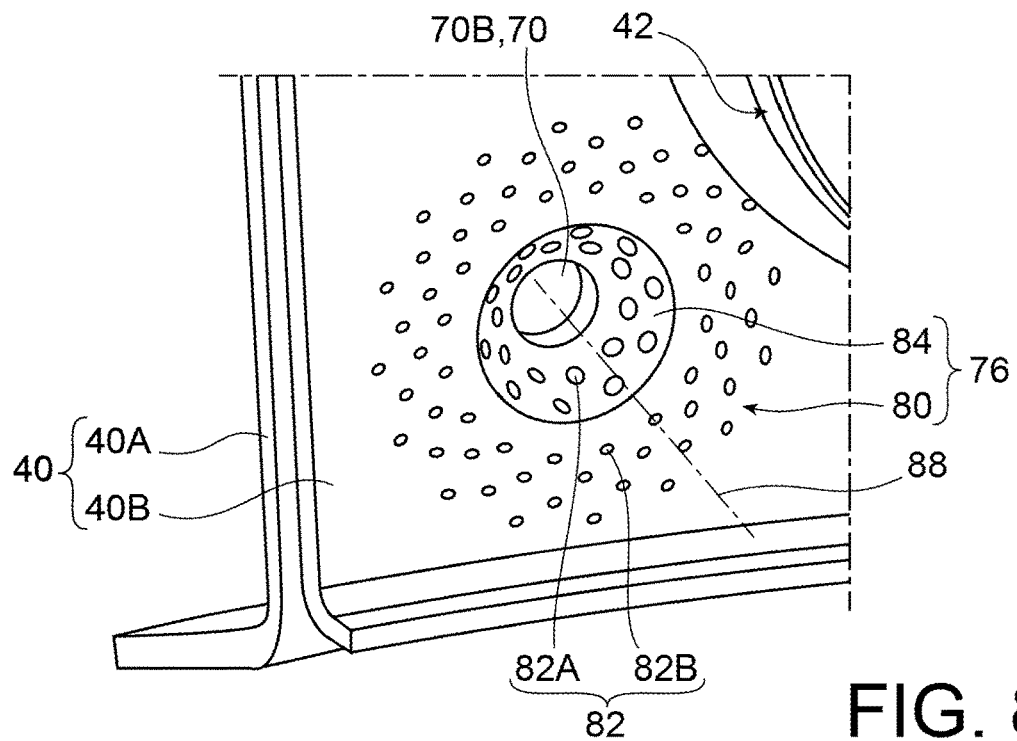
FIG. 8 is a view to a larger scale of a part of FIG. 7.

In the embodiment illustrated in FIGS. 4 to 8, each secondary injection system 72 includes two secondary injection devices 76, arranged on the same side with respect to the corresponding main injection system 42 (i.e. the main injection system delivering the sheet of air/fuel mixture forming the corner recirculation region 64 wherein the respective secondary fuel-injection nozzles 78 of the two secondary injection devices 76 inject fuel). In addition, the two secondary injection devices 76 of each secondary injection system 72 are arranged respectively radially towards the outside and radially towards the inside with respect to the corresponding main injection system 42. Thus the two secondary injection devices 76 of each secondary injection system 72 are for example arranged respectively radially outwards and radially inwards with respect to a circle 83 centred on the longitudinal axis 28 of the turbine engine and passing through the respective injection axes 44 of the main injection systems 42 (FIGS. 4 and 7).

Each secondary injection device 76 further includes a respective divergent annular surface 84 formed in the annular chamber-end structure 40 (FIGS. 5-8), so as to delimit an outlet of the corresponding secondary passage 70, and having a form divergent in the direction of the interior volume V of the combustion chamber.

More precisely, in the embodiment illustrated, the respective divergent annular surface 84 of each secondary injection device 76 forms a downstream portion of the interior surface of a respective chimney 86 (FIGS. 5 and 6), projecting upstream from the annular shield 40B, and delimiting the corresponding secondary orifice 70B.

In the example illustrated in FIGS. 4-8, the respective annular set 80 of air-inlet orifices 82 of each secondary injection device 76 includes first air-inlet orifices 82A formed in the respective divergent annular surface 84 of the secondary injection device 76, and second air-inlet orifices 82B arranged around the respective divergent annular surface 84 of the secondary injection device 76.

Moreover, the air-inlet orifices 82 of each annular set 80 are conformed to confer a swirling character on the air passing through these orifices. In other words, the air-inlet orifices 82 of each annular set 80 have respective axes oriented so as to make the air passing through these orifices rotate, about a respective secondary injection axis 88 (FIGS. 6-8) defined by the corresponding secondary injection nozzle 76 and coincident with the axis of revolution of the corresponding divergent annular surface 84.

The first air-inlet orifices 82A on the one hand, and the second air-inlet orifices 82B on the other hand, can be oriented in the same direction to conjointly form a corotational flow, or on the contrary be oriented in opposite directions so as to conjointly form a contrarotational flow.

Moreover, the secondary injection nozzles 76 and the corresponding divergent annular surfaces 84 are preferably configured so that the corresponding secondary injection axes 88 are oriented parallel to the injection axis 44 defined by the corresponding main injection system 42.

With reference to FIG. 4, the fuel supply to the main injection systems 42 is provided by means of a main fuel supply system, which may be of a conventional type. This system comprises in particular main tubes 90 at the ends of which the main fuel injection nozzles 54 are respectively arranged. This system also comprises a fuel supply circuit (not visible in the figures) provided with means for regulating the flow rate of fuel, which take for example the form of a plurality of regulation devices 92 to which the main tubes 90 are respectively connected.

More precisely, each main tube 90 includes for example a proximal portion 90A that extends radially inwards from a platform 96 intended to be attached to an external casing, and which emerges in an angled portion 90B that itself emerges in a distal portion of the main tube extending along the corresponding injection axis 44 and forming the corresponding main injection nozzle 54.

The fuel supply to the secondary injection systems 72 is provided by means of a secondary fuel supply system, configured for supplying the secondary injection systems 72 with fuel when the turbine engine is operating at an operating speed below or equal to a predetermined speed, and, preferably, for stopping the fuel supply to the secondary injection systems 72 when the turbine engine is operating at an operating speed higher than the predetermined speed.

The predetermined speed is advantageously the idle speed. The fuel supply to the secondary injection systems 72 is thus operated under the operating conditions at which the combustion chamber has a risk of extinction, as well as during the ignition of the combustion chamber.

In the embodiment illustrated, the secondary fuel supply system comprises secondary tubes 94 at the end of which the secondary fuel-injection nozzles 78 are respectively arranged.

These secondary tubes 34 are for example each connected to a corresponding main tube 90.

Preferably, each secondary tube 94 extends transversely to the injection axis 44 defined by the corresponding main fuel-injection nozzle 54, from the corresponding main tube 90.

Each secondary tube 94 thus includes a proximal portion 94A that extends transversely to the injection axis 44, for example from the angled portion 90B, and which emerges in an angled portion 94B that is extended in a distal portion substantially parallel to the corresponding injection axis 44 and forming the corresponding secondary fuel-injection nozzle 78.

In the example illustrated wherein each secondary injection system 72 includes two secondary injection devices 76 arranged as explained above, the respective proximal portions 94A of the secondary tubes 94 extend in directions inclined with respect to a direction tangent to the circle 83 at the injection axis 44, respectively radially outwards and radially inwards with respect to the injection axis 44, while moving away from the injection axis 44.

In operation, fuel is supplied to the main injection systems 42 by the main fuel-supply system, in a conventional manner.

For example, in the case where the main fuel-injection nozzles 54 are of the dual circuit type, i.e. comprising a pilot injector surrounded by a main injector, the pilot injector is supplied with fuel at idle and at low speed, and optionally at the other operating speeds of the turbine engine, while the main injector is supplied with fuel only at high speed.

Moreover, fuel is supplied to the secondary injection systems 72, in this case to the secondary fuel-injection nozzles 78 in the embodiment illustrated, when the turbine engine is operating at a speed below or equal to the predetermined speed, in this case at the idle speed. Thus the secondary fuel-injection systems 72 inject the additional flow of air and fuel directly into the respective corner recirculation regions 64 of the sheets of the air/fuel mixture respectively delivered by the main injection systems 42.

On the other hand, the supply of fuel to the secondary injection systems 72 is preferably interrupted when the turbine engine is operating at a speed higher than the idle speed.

The turbine engine is preferably configured so that the main injection systems 42 inject between 10% and 30% (inclusive) of the total air flow circulating in the combustion chamber (the rest being supplied to the chamber by orifices formed in the two coaxial annular walls 32 and 34, and by the secondary injection systems 72).

In addition, the turbine engine is preferably configured so that the ratio of fuel flow to the air flow ("FAR", or "Fuel-Air Ratio") coming from the main injection systems 42 is between 5 and 50 thousandths (inclusive), this ratio being able to vary in operation.

The turbine engine is preferably configured so that the secondary injection systems 72 inject between 1% and 5% (inclusive) of the total air flow circulating in the combustion chamber, with an FAR ratio of between 0 and 10 thousandths.

The number of secondary injection devices 76 per secondary injection system 72, as well as the arrangement thereof with respect to the corresponding main injection system 42, may of course differ from the above description without departing from the scope of the invention.

Figure 9:
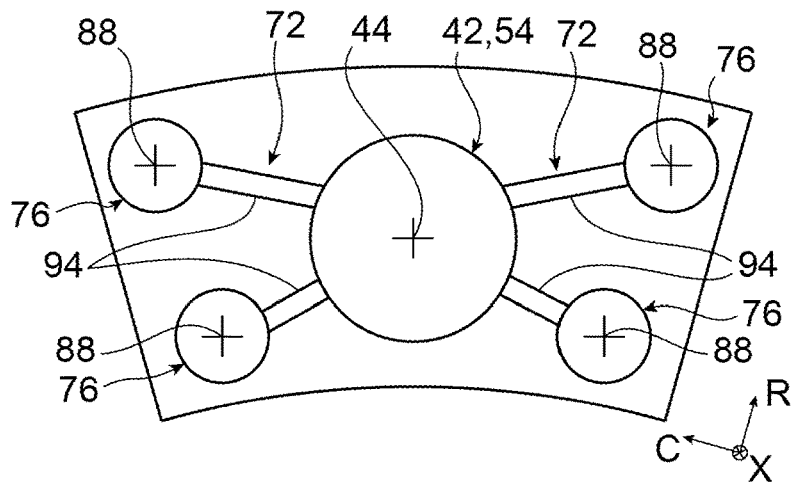
FIGS. 9 to 11 are partial schematic front views, from the upstream end, of combustion chambers and of main and secondary fuel-supply systems, respectively according to other embodiments of the invention.
Figure 10:
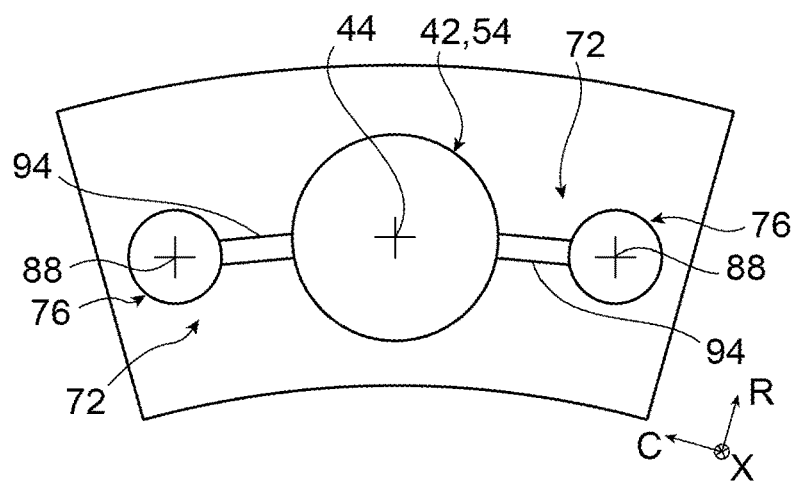
Figure 11:
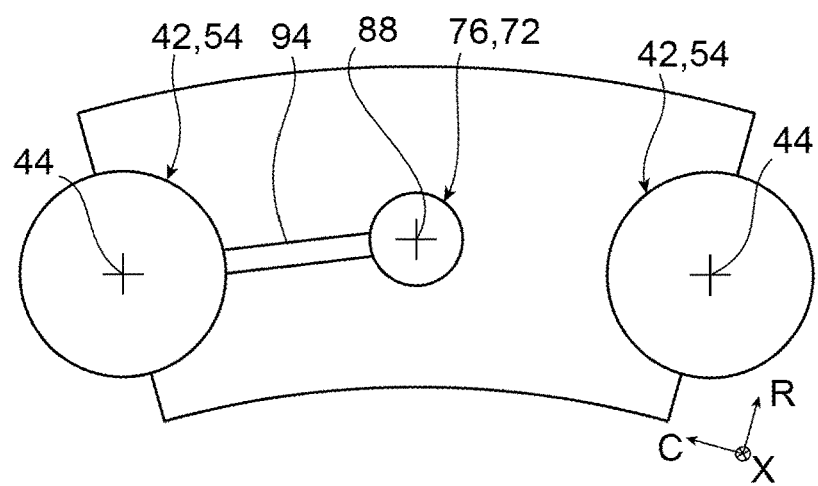

FIGS. 9-11 thus illustrate, by way of examples, three other possible configurations.

FIG. 9 corresponds to a configuration with four secondary injection devices 76 per secondary injection system 72, the devices 76 being arranged respectively at the vertices of a trapezium centred with respect to the corresponding main injection system 42.

FIG. 10 corresponds to a configuration with two secondary injection devices 76 per secondary injection system 72, the secondary injection devices 76 being arranged circumferentially on either side of the corresponding main injection system 42.

Finally, FIG. 11 corresponds to a configuration with a single secondary injection device 76 per secondary injection system 72.

In general terms, the injection of the additional flow of air and fuel into the corner recirculation regions 64 by means of the secondary injection systems 72 makes it possible to improve the carburation in these regions, and therefore to lower the extinction limit of the combustion chamber and to facilitate re-ignition of the combustion chamber in flight.

The invention also makes it possible to improve the homogeneity of the combustion region in the interior volume of the combustion chamber, and therefore to reduce the emissions of polluting compounds, in particular carbon monoxide.

In the preferred embodiments of the invention, the swirling character of the flow coming from the annular sets 80 of air-inlet orifices allows optimum carburation in the corner recirculation regions 64.

The admission of air by means of the annular sets 80 of air-inlet orifices, formed in the annular chamber-end structure 40, respectively around the secondary fuel-injection nozzles 78, makes it possible for the secondary injection devices 76 to be relatively compact and thus to be integrated in a satisfactory manner between two consecutive main injection systems 42.

What is claimed is:

1. A combustion chamber for an aircraft turbine engine, comprising:
   an annular chamber-end structure, and two coaxial annular walls comprising a radially inner annular wall and a radially outer annular wall connected together by the annular chamber-end structure and centred with respect to a longitudinal axis of the combustion chamber, so that the annular chamber-end structure and the radially inner annular wall and the radially outer annular wall delimit an interior volume of the combustion chamber;
   main passages formed through the annular chamber-end structure;
   an annular row of main injection systems mounted respectively in the main passages, each main injection system of the annular row of main injection systems comprising a respective main fuel-injection nozzle defining a respective injection axis, and at least one respective air-inlet swirler, configured for delivering a respective sheet of an air/fuel mixture in the interior volume of the combustion chamber, the respective sheet of the air/fuel mixture comprising a respective central recirculation region and a respective corner recirculating region extending annularly around the respective central recirculation region, wherein the respective central recirculation region and the respective corner recirculating region are centred on the respective injection axis defined by the respective main fuel-injection nozzle;
   secondary injection systems, each secondary injection system of the secondary injection systems configured for injecting an additional flow of air and fuel directly into the respective corner recirculation region extending annularly around the respective central recirculation region of a corresponding main injection system of the main injection systems, the each secondary injection system comprising a plurality of secondary injection devices that are each configured for supplying at least part of the fuel of the additional flow of air and fuel and at least part of the air of the additional flow of air and fuel, through a corresponding secondary injection region of the annular chamber-end structure separated from the main passages, wherein each of the plurality of secondary injection devices includes:
      a respective secondary fuel-injection nozzle mounted in a corresponding secondary passage formed through the corresponding secondary injection region of the annular chamber-end structure, to supply said at least part of the fuel of the additional flow of air and fuel,
      a divergent annular surface that delimits an outlet of the corresponding secondary passage, wherein the divergent annular surface radially expands in a direction from the annular chamber-end structure toward the interior volume of the combustion chamber, and
      a respective annular set of air-inlet orifices formed in the divergent annular surface, distributed around said corresponding secondary passage and emerging in the interior volume of the combustion chamber, so as to supply said at least part of the air of the additional flow of air and fuel,
   a secondary fuel-supply system configured for supplying the secondary injection systems with the fuel when the aircraft turbine engine is operating at an operating speed below or equal to a predetermined speed, and for stopping the fuel to the secondary injection systems when the aircraft turbine engine is operating at an operating speed higher than the predetermined speed, wherein the annular chamber-end structure includes an annular chamber end wall centred with respect to the longitudinal axis of the combustion chamber, wherein the annular chamber end wall comprises an inner radius connected to the radially inner annular wall and an outer radius connected to the radially outer annular wall such that the annular chamber end wall extends from the radially inner annular wall to the radially outer annular wall, wherein the annular chamber end wall at least partly defines the main passages and the corresponding secondary passage of each of the plurality of secondary injection devices, said main passages and said corresponding secondary passage of each of the plurality of secondary injection devices being located between the inner radius and the outer radius.

2. The combustion chamber according to claim 1, wherein each of the plurality of secondary injection devices includes a respective set of second air-inlet orifices arranged around the respective divergent annular surface of the at least one secondary injection device.

3. The combustion chamber according to claim 1, wherein the annular set of air-inlet orifices of each of the plurality of secondary injection devices is configured for conferring a swirling character on the air passing through said annular set of air-inlet orifices.

4. The combustion chamber according to claim 1, wherein:
the annular chamber-end wall is arranged on an external side of the combustion chamber,
the annular chamber-end structure includes an annular shield arranged on an interior side of the combustion chamber opposite the annular chamber-end wall,
the secondary passage of each of the plurality of secondary injection devices is formed by a respective secondary orifice formed in the annular shield, and a respective secondary opening formed in the annular chamber-end wall, opposite the respective secondary orifice, and
a respective set of second air inlet orifices of each of the plurality of secondary injection devices is formed in the annular shield, around the respective secondary orifice of the secondary injection device.

5. A turbine engine, comprising a combustion chamber according to claim 1.

6. The turbine engine according to claim 5, wherein the predetermined speed is the idle speed.

7. The turbine engine according to claim 5, further comprising a main fuel-supply system comprising main tubes at the end of which the respective main fuel-injection nozzle of the main injection system are respectively arranged, and wherein the secondary fuel-supply system comprises secondary tubes at the end of which the plurality of secondary injection devices are respectively connected, the secondary tubes each being connected to a corresponding main tube.

8. The turbine engine according to claim 7, wherein each secondary tube includes a proximal portion extending transversely to the injection axis defined by the corresponding main fuel-injection nozzle.

9. A method for supplying the fuel to the combustion chamber according to claim 1 in the aircraft turbine engine, the method comprising:
supplying the fuel to the secondary injection systems when the aircraft turbine engine is operating at the operating speed below or equal to the predetermined speed, so that the secondary injection systems inject the additional flow of air and fuel directly into the respective corner recirculation regions of the sheets of the respective air/fuel mixture delivered by the main injection systems of the combustion chamber, and
stopping the fuel to the secondary injection systems when the aircraft turbine engine is operating at the operating speed above the predetermined speed.

10. The combustion chamber according to claim 1, wherein the secondary passage of each of the plurality of secondary injection devices is smaller in diameter than each of the main passages.

11. A combustion chamber for an aircraft turbine engine, comprising:
an annular chamber-end structure defining a main passage and a plurality of secondary passages;
a radially inner annular wall and a radially outer annular wall connected together by the annular chamber-end structure and centred with respect to a longitudinal axis of the combustion chamber, so that the annular chamber-end structure, the radially inner annular wall, and the radial outer annular wall delimit an interior volume of the combustion chamber;
a main injection system mounted in the main passage of the annular chamber-end structure, the main injection system comprising:
a main fuel-injection nozzle having an injection axis, and
an air-inlet swirler configured for delivering a sheet of an air/fuel mixture in the interior volume of the combustion chamber, the sheet of the air/fuel mixture comprising a central recirculation region and a corner recirculating region extending annularly around the central recirculation region, wherein the central recirculation region and the corner recirculating region are centred on the injection axis of the main fuel-injection nozzle;
a plurality of secondary injection devices configured for injecting an additional flow of air and fuel directly into the corner recirculation region extending annularly around the central recirculation region of the main injection system, each secondary injection device of the plurality of secondary injection devices comprising:
a secondary fuel-injection nozzle mounted in a corresponding secondary passage of the plurality of secondary passages and configured to supply the fuel for the additional flow of air and fuel,
a divergent annular surface that delimits an outlet of the corresponding secondary passage, wherein divergent annular surface radially expands in a direction from the annular chamber-end structure toward the interior volume of the combustion chamber, and
an annular set of air-inlet orifices formed in the divergent annular surface and distributed around the corresponding secondary passage, the annular set of air-inlet orifices being configured to supply air for the additional flow of air and fuel;
a secondary fuel-supply system configured for supplying the secondary injection devices with the fuel when the aircraft turbine engine is operating at an operating speed below or equal to a predetermined speed, and for stopping the fuel to the secondary injection devices when the aircraft turbine engine is operating at an operating speed higher than the predetermined speed.

12. The combustion chamber according to claim 11, wherein the annular chamber-end structure includes:
an annular chamber end wall that extends from the radially inner annular wall to the radially outer annular wall, the annular chamber-end wall being arranged on an external side of the combustion chamber, and an annular shield arranged on an interior side of the combustion chamber opposite the annular chamber-end wall.

13. The combustion chamber according to claim 12, wherein for the each secondary injection device:

the corresponding secondary passage is formed by a secondary orifice formed in the annular shield, and a secondary opening formed in the annular chamber-end wall, opposite the secondary orifice, and a set of second air inlet orifices of the secondary injection device is formed in the annular shield, around the secondary orifice.

14. The combustion chamber according to claim 11, wherein each secondary passage of the plurality of secondary passages is smaller in diameter than the main passage.

* * * * *